US009003039B2

(12) United States Patent
Amorim

(10) Patent No.: US 9,003,039 B2
(45) Date of Patent: Apr. 7, 2015

(54) METHOD AND APPARATUS OF RESOURCE ALLOCATION OR RESOURCE RELEASE

(71) Applicant: Thales Canada Inc, Toronto (CA)

(72) Inventor: Aaron Amorim, Whitby (CA)

(73) Assignee: Thales Canada Inc., Toronto, Ontario (CA)

( * ) Notice: Subject to any disclaimer, the term of this patent is extended or adjusted under 35 U.S.C. 154(b) by 313 days.

(21) Appl. No.: 13/689,132

(22) Filed: Nov. 29, 2012

(65) Prior Publication Data
US 2014/0149594 A1 May 29, 2014

(51) Int. Cl.
G06F 15/173 (2006.01)
H04L 12/54 (2013.01)
H04W 28/16 (2009.01)

(52) U.S. Cl.
CPC ......... G06F 15/17306 (2013.01); H04W 28/16 (2013.01); H04L 12/5695 (2013.01)

(58) Field of Classification Search
CPC .......................... H04L 12/5695; H04W 28/16
USPC .................................................. 709/226, 224
See application file for complete search history.

(56) References Cited

U.S. PATENT DOCUMENTS

| 5,724,272 | A  | * | 3/1998  | Mitchell et al. ................ 702/123 |
| 6,226,263 | B1 | * | 5/2001  | Iwase et al. .................... 370/231 |
| 6,823,472 | B1 | * | 11/2004 | DeKoning et al. .............. 714/10 |
| 6,832,204 | B1 |   | 12/2004 | Doner |
| 7,284,244 | B1 | * | 10/2007 | Sankaranarayan et al. ... 718/104 |
| 7,484,242 | B2 |   | 1/2009  | Aggarwal et al. |
| 7,813,846 | B2 |   | 10/2010 | Wills et al. |
| 8,082,153 | B2 |   | 12/2011 | Coffman et al. |
| 8,179,809 | B1 |   | 5/2012  | Eppstein et al. |
| 8,234,650 | B1 |   | 7/2012  | Eppstein et al. |
| 8,495,218 | B1 | * | 7/2013  | Shao et al. ...................... 709/226 |
| 2003/0005130 | A1 | * | 1/2003 | Cheng ............................ 709/228 |
| 2004/0111309 | A1 |   | 6/2004 | Matheson et al. |
| 2005/0027865 | A1 | * | 2/2005 | Bozak et al. ................... 709/226 |
| 2006/0074544 | A1 |   | 4/2006 | Morariu et al. |

(Continued)

FOREIGN PATENT DOCUMENTS

EP 2402229 1/2012

OTHER PUBLICATIONS

Crowston, Kevin. "The Evolution of Resource Allocation Mechanisms for Space Allocation in Transportation Systems." Syracuse University, Syracusem New York. Nov. 4, 2000. <URL:http://citeseerx.ist.psu.edu/viewdoc/download?doi=10.1.1.16.8839&rep=rep1&type=pdf.>.

(Continued)

Primary Examiner — Hieu Hoang
(74) Attorney, Agent, or Firm — Lowe Hauptman & Ham, LLP

(57) ABSTRACT

A method of resource allocation by a resource controlling device includes receiving, from a sending device, a list of resource devices requested by a resource requesting device. Allocation of a first resource device on the list of resource devices is performed. A list of remaining resource devices is sent to a next resource controlling device if the first resource device on the list of resource devices is successfully allocated for the resource requesting device and the first resource device is not a last resource device on the list of resource devices. An allocation failure message is sent to the sending device if the first resource device on the list of resource devices is not successfully allocated for the resource requesting device.

20 Claims, 7 Drawing Sheets

(56) References Cited

U.S. PATENT DOCUMENTS

| | | | |
|---|---|---|---|
| 2006/0101469 A1 | 5/2006 | Hathorn | |
| 2008/0109124 A1 | 5/2008 | Daum et al. | |
| 2008/0208397 A1 | 8/2008 | Miklos | |
| 2011/0307570 A1* | 12/2011 | Speks | 709/208 |
| 2012/0004796 A1 | 1/2012 | Michaut | |

OTHER PUBLICATIONS

Chandra et al. "A Signaling Protocol for Structured Resource." 1999 <http://citeseerx.ist.psu.edu/viewdoc/download?doi=10.1.1.28.1683&rep=rep1&type=pdf.>.

Du, Weimin et al. "Distributed Resource Management in Workflow Environments." 1997 <http://www.comp.nus.edu.sg/~lingtw/dasfaa_proceedings/DASFAA97/P521.pdf>.

Flamini. "Real time management of a metro rail terminus." 2008. <http://scholar.googleusercontent.com/scholar?q=cache:RTv_Q1TLyssJ:scholar.google.com/&hl=en&as_sdt=1,14>.

GAT. "Integrating Planning and Reacting in a Heterogeneous Asynchronous Architecture for Controlling Real-World Mobile Robots." 1992. <http://freelug.net/IMG/pdf/Integrating_Planning_and_Reacting_in_a_Heterogeneous_Asynchronous_Architecture.pdf>.

* cited by examiner

METHOD AND APPARATUS OF RESOURCE ALLOCATION OR RESOURCE RELEASE

BACKGROUND

A guided transportation system includes a plurality of signaling and guiding components (also referred to as resource devices) for defining and interlocking route segments for vehicles of the transportation system. A vehicle in the guided transportation system is assigned a task to move from a start point to an end point along a designated route, which includes one or more route segments defined by corresponding resource devices. The vehicle has to confirm that all the resource devices needed to perform the task have been allocated to the vehicle before starting the performance of the task. In some occasions, a resource device is necessary for multiple vehicles with different assigned routes, and thus the multiple vehicles compete with one another for the allocation of the resource device.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
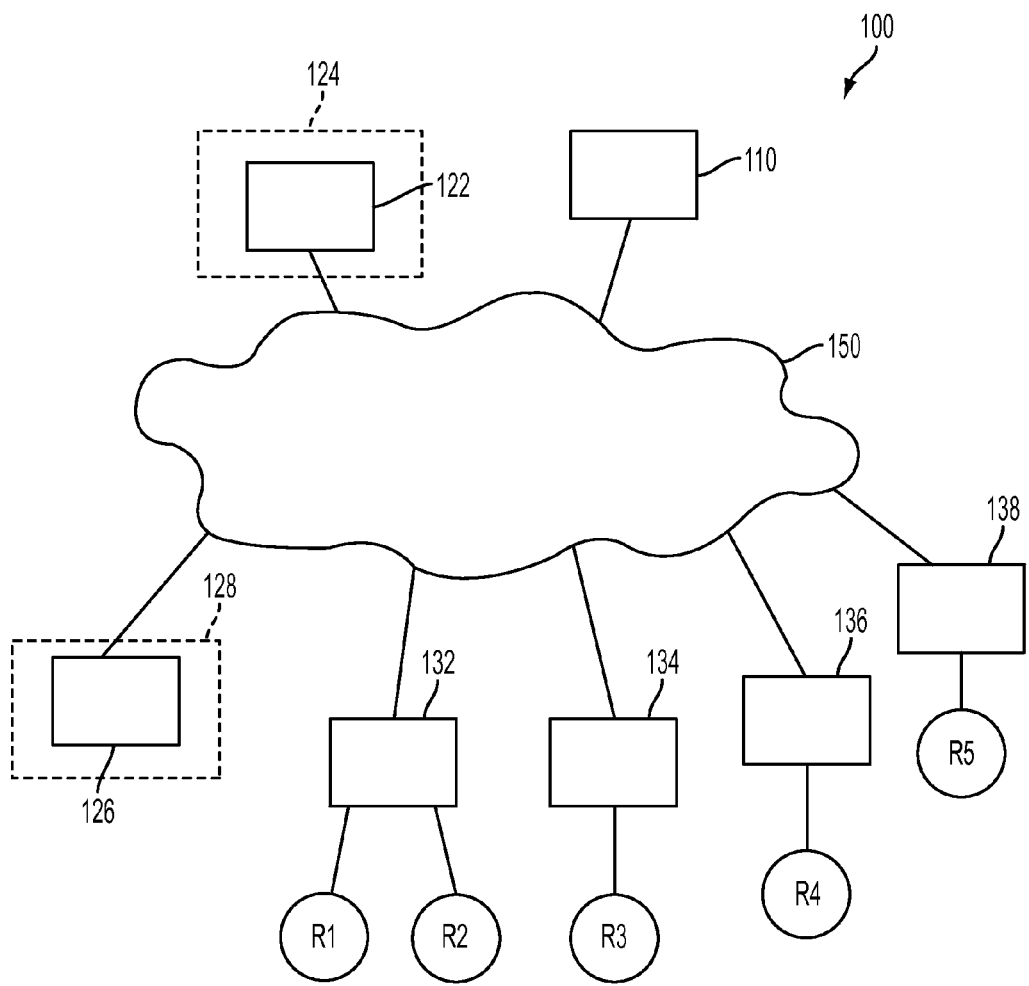
FIG. 1 is a system diagram of a transportation system in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

FIG. 1 is a system level diagram of a transportation system 100 in accordance with one or more embodiments. The transportation system 100 includes central control equipment 110, a first resource requesting device 122 onboard a first vehicle 124, a second resource requesting device 126 onboard a second vehicle 126, and four resource controlling devices 132, 134, 136, and 138. Each of the resource controlling devices 132, 134, 136, and 138 are associated with one or more resource devices R1, R2, R3, R4, and R5. For example, the resource controlling device 132 is coupled to the resource devices R1 and R2. The resource controlling device 132 controls the operations of the resource devices R1 and R2. The resource controlling device 132 is also responsible for reserving the resource device R1 or R2 for a particular resource requesting device 122 or 126 (i.e., "resource allocation") or making the resource device R1 or R2 available for further requests from the resource requesting device 122 or 126 (i.e., "resource release"). In some embodiments, the resource controlling device 132 is a stand-alone device physically different from the resource devices R1 and R2. In some embodiments, the resource controlling device 132 and one or all of the associated resource devices R1 and R2 are implemented as an integrated device.

The central control equipment 110, the first resource requesting device 122, the second resource requesting device 126, and the resource controlling devices 132, 134, 136, and 138 are capable of communicating with one another through a communication network (network) 150. In some embodiments, the network 150 is in compliance with one or more of wireless communication protocols such as BLUETOOTH, WIFI, WIMAX, GPRS, or WCDMA, and/or wired communication protocols such as ETHERNET, USB, or IEEE-1394.

In at least one embodiment, the central control equipment 110 dispatches a task to the first vehicle 214, and the first resource requesting device 122 onboard the first vehicle determines the resource devices needed for performing the task based on a database onboard the first vehicle. The first resource requesting device 122 generates a list of resource devices to be allocated and works with some or all of the resource controlling devices 132, 134, 136, and 138 corresponding to the resource devices R1, R2, R3, R4, or R5 needed for performing the task. In some embodiments, there are more or less than two vehicles in the transportation system 100. In some embodiments, there are more or less than four resource controlling devices associated with more or less than five resource devices in the transportation system 100. In some embodiments, if resource devices previously allocated for the first resource requesting device 122 are no longer needed by the first vehicle 124, the first resource requesting device 122 also generates a list of resource devices to be released and works with appropriate resource controlling devices 132, 134, 136, or 138 to release the previously-allocated resource devices R1, R2, R3, R4, or R5.

Figure 2A:
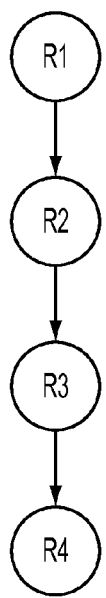
FIGS. 2A-2B are diagrams of example list of resource devices in accordance with one or more embodiments.
Figure 2B:
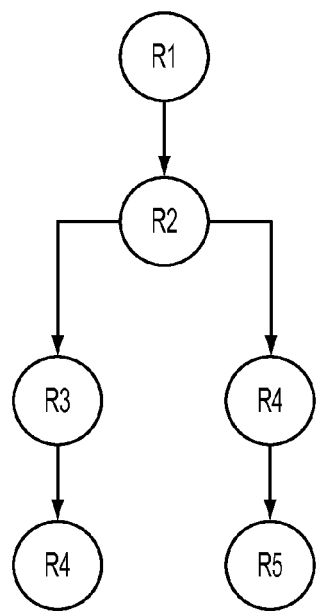

FIG. 2A is a diagram of an example list 210 of resource devices in accordance with one or more embodiments. The list 210 is a linear style list having the resource devices R1, R2, R3, and R4 sequentially arranged based on the order the resource devices are going to be used by the vehicle when performing the task. FIG. 2B is a diagram of another example list 220 of resource devices in accordance with one or more embodiments. The list 220 is a tree style list having two braches indicative of alternative combinations and orders of resource devices R1, R2, R3, R4, and R5 needed to perform the task. The list 220 provides two possible ways to allocate the resource devices for the task. The resource devices R1, R2, R3, R4, and R5 along individual branches are sequentially arranged based on the order the resource devices are going to be used by the vehicle when performing the task.

Figure 3:
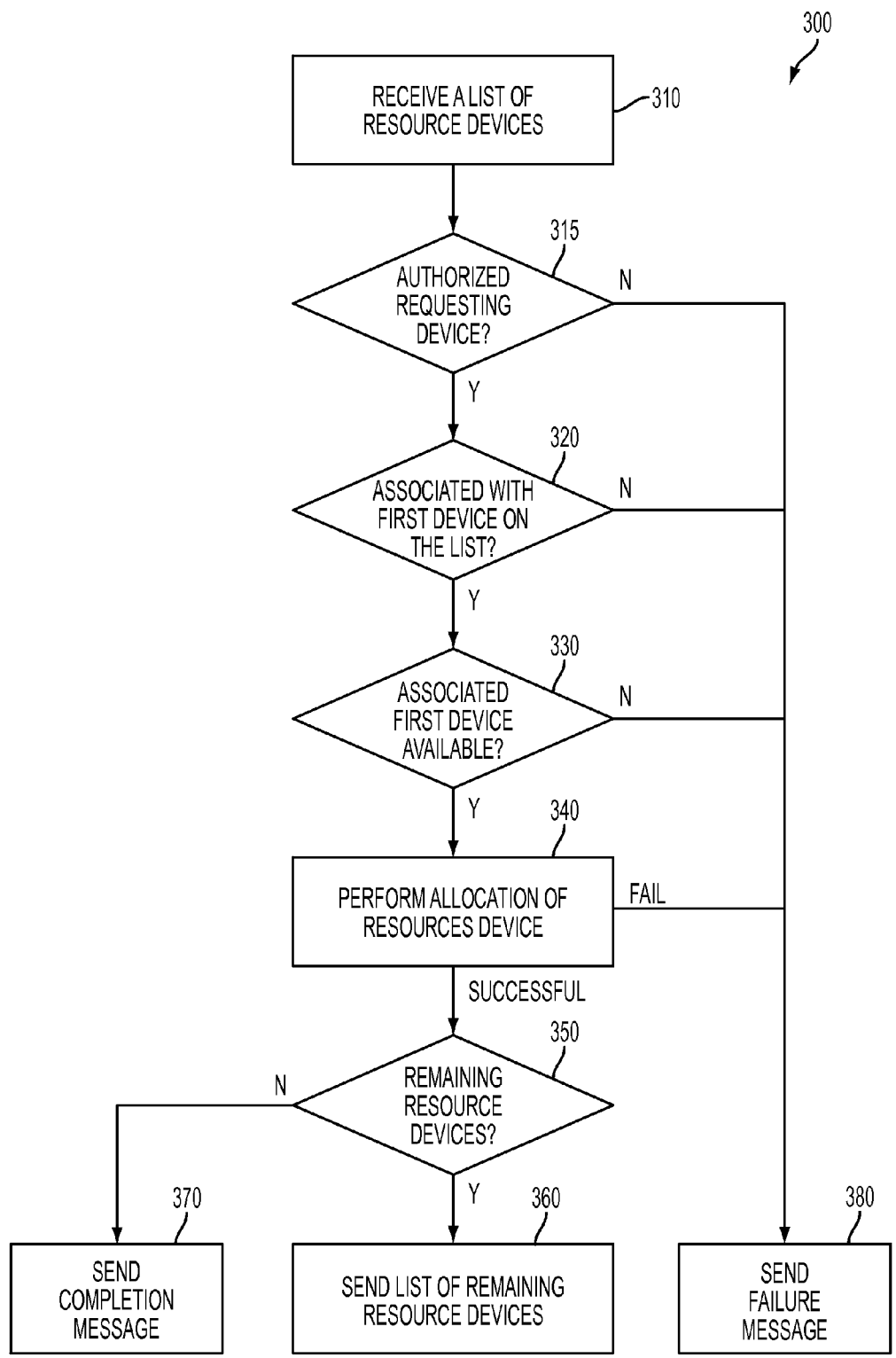
FIG. 3 is a flow chart of a method of resource allocation for a resource requesting device in accordance with one or more embodiments.

FIG. 3 is a flow chart of a method 300 of resource allocation for a resource requesting device 122 or 126 in accordance with one or more embodiments. It is understood that additional operations may be performed before, during, and/or after the method 300 depicted in FIG. 3, and that some other processes may only be briefly described herein.

As depicted in FIG. 3 and FIGS. 1 and 2A, in operation 310, a resource controlling device 132 receives a list of resource devices (such as the list 210 in FIG. 2A) requested by the resource requesting device 122 from a sending device. In some embodiments, if the resource controlling device 132 is associated with a first resource device R1 on the list 210 as originally issued by the resource requesting device 122, the sending device is the resource requesting device 122, and the received list is a complete list of requested resource devices. In some embodiments, if the resource controlling device (such as resource controlling device 134) is associated with the resource device (e.g., resource device R3) not on the top of the list 210 as originally issued by the resource requesting device 122, the sending device is another resource controlling device (e.g., resource controlling device 132), and the received list is a list of remaining resource devices that need to be further allocated.

In operation 315, the resource controlling device 132 determines if the list of resource devices from the resource requesting device 122 is authorized, i.e., the resource requesting device 122 is currently an authorized resource requesting device. In some embodiments, the resource requesting device 122 is a trusted resource requesting device to the transportation system 100 but only an authorized resource requesting device during one or more predetermined time frames. In some embodiments, the resource requesting device 122 is authorized if the resource requesting device 122 is on a predetermined list of authorized resource requesting devices. In at least one embodiment, all resource requesting devices 122 and 126 are authorized, and thus operation 315 is omitted. In some embodiments, the central control equipment 110 maintains and updates a predetermined list of authorized resource requesting devices for all the resource controlling devices 132, 134, 135, and 138. In some embodiments, the central control equipment 110 maintains and updates a plurality of predetermined list of authorized resource requesting devices tailored for individual resource controlling devices 132, 134, 135, and 138.

If the resource requesting device 122 is determined to be authorized, the process then moves on to operation 320, where the resource controlling device 132 confirms if the first resource device (such as R1) on the list of resource devices 210 are in fact associated with the resource controlling device 132. If the first resource device R1 is associated with the resource controlling device 132, the process moves on to operation 330.

In operation 330, the resource controlling device 132 determines if the first resource device R1 is available to the first resource requesting device 122. In some embodiments, the resource device R1 is set to one of the "unallocated," "allocated," and "pending" states. In some embodiments, the resource device R1 is available if the resource device R1 is currently set to the "unallocated" state.

The process then moves on to operation 340, where resource device R1 is allocated to the resource requesting device 122. In some embodiments, the resource device R1 will be set to the "allocated" state for the first resource requesting device 122. In some embodiments, the resource device R1 will be temporarily set to the "pending" state, and the process moves on to operation 360. The resource controlling device 132 will subsequently set the resource device R1 to be "allocated" state if all remaining resource devices on the list 210 are successfully allocated. Otherwise, the resource controlling device 132 will subsequently set the resource device to be the "unallocated" state, and the resource allocation operation 340 is deemed failed.

After the resource device R1 is set to "pending" or "allocated" for the resource requesting device 122, the process moves on to operation 350, where the resource controlling device 132 determines if the resource device R1 is the last resource devices on the list 210. If the resource device R1 is not the last resource device on the list 210, the remaining resource devices on the list 210, such as remaining resource devices R2, R3, and R4, will be passed along to a next corresponding resource controlling device. In some embodiments, if the next corresponding resource controlling device happens to be the current resource controlling device 132 (for resource device R2), the process then moves back to operation 340 to allocate the resource device R2 associated to the same resource controlling device 132. In some embodiments, instead of immediately performing operation 340 again for the next resource device R2 of the same resource controlling device 132, the process moves on to operation 360.

In operation 360, the resource controlling device 132 sends a list of remaining resource devices (e.g., resource devices R3 and R4) to the next resource controlling device 134. A first resource device R3 on the list of remaining resource devices is associated with the next resource controlling device 134. On the other hand, if the resource device currently being processed is the last resource device on the list 210, the resource controlling device 132 sends an allocation completion message to the sending device and/or the resource requesting device 122 in operation 370.

In operation 340, if the resource device R1 or R2 is not successfully allocated for the resource requesting device 122, the process moves on to operation 380. The resource controlling device 132 sends an allocation failure message to the sending device. In addition, for any negative results from operations 315, 320, and 330, the process also moves on to operation 380 to send an allocation failure message to the sending device.

The resource controlling device 134, 136, and 138 also perform the method 300 when receiving a list of resource devices. For example, the resource controlling device 134 receives the list of remaining resource devices from a sending device (i.e., the resource controlling device 132) in operation 310. The resource controlling device 134 then determines if the first resource device R3 on the list of remaining resource devices is associated with the resource controlling device 134 in operation 320 and performs resource allocation as described above with regard to operations 330 and 340. If the allocation of resource device R3 for the first resource requesting device 122 is successful, the resource controlling device 134 then sends another list of remaining resource devices (now only has resource device R4) to the corresponding resource controlling device 136.

If the allocation of resource device R4 for the first resource requesting device 122 is successful, the resource controlling device 136 in operation 350 determines that the resource device R4 is indeed the last resource device on the list that the resource controlling device 136 receives. As a result, the resource controlling device 136 sends an allocation completion message to the sending device (i.e., the resource controlling device 134) and/or the resource requesting device 122 in operation 370.

In some embodiments, in operation 370, the resource controlling device 132, 134, or 136 sends the allocation completion message directly to the resource requesting device 122 if, for individual resource controlling devices, the first resource devices is also the last resource devices on the list of resource devices. In some embodiments, the allocation completion message is relayed back to the resource requesting device 122 in a stage by stage manner by all the intermediate resource controlling devices. As such, each of the intermediate resource controlling devices sends an allocation completion message to a corresponding sending device upon receipt of an allocation completion message from a corresponding next resource controlling device.

In some embodiments, in operation 380, the resource controlling device 132, 134, or 136 sends the failure message directly to the resource requesting device 122 and/or indirectly in a stage by stage manner by all the intermediate resource controlling devices for the list of resource devices requested by the resource requesting device 122. In some embodiment, the resource controlling device 132, 134, or 136 receives an allocation failure message from the next resource controlling device and passes it along to the corresponding sending devices. Also, in some embodiments, responsive to the allocation failure message from the next resource controlling device, the resource controlling device 132, 134, or 136 releases the allocation of the corresponding resource devices for the resource requesting device 122.

As depicted in FIG. 3 and FIGS. 1 and 2B, in operation 360, if the resource controlling device (such as the resource controlling device 132 associated with the resource device R2) receives an allocation failure message from the next resource controlling device (such as the resource controlling device 134 associated with the resource device R3), the resource controlling device 132 sends an alternative list of remaining resource devices (including resource devices R4 and R5) to another corresponding resource controlling device 136, with which a first resource device R4 on the alternative list of remaining resource devices is associated.

Therefore, the allocation of resource devices is performed according to the order of the resource devices on a list of resource devices by corresponding resource controlling devices in a sequential manner. A first-on-the-list resource controlling device receives a full list directly from the resource requesting device, and then each following resource controlling devices receive a list of remaining resource devices from corresponding previous resource controlling devices. In some embodiments, a list of remaining resource devices is still a full list of resource devices with inclusion of status information indicative of which resource device on the list is the first not-yet-processed resource device.

Figure 4A:
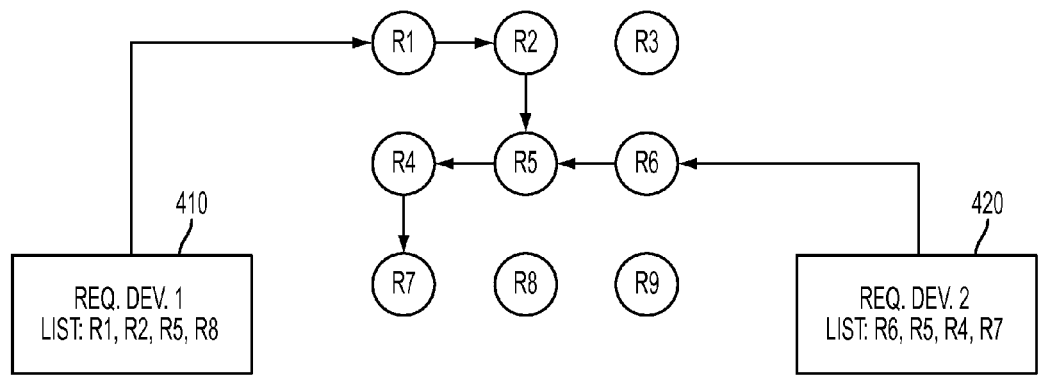
FIGS. 4A and 4B are diagrams of example resource contention scenarios in accordance with one or more embodiments.
Figure 4B:
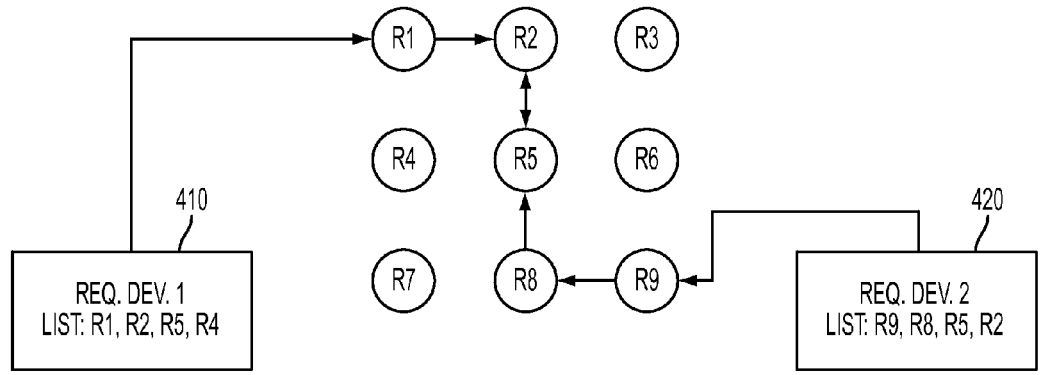

FIGS. 4A and 4B are diagrams of example resource contention scenarios in accordance with one or more embodiments. Resource contention occurs when two or more resource requesting devices are asking for the allocation of the same resource device. In some embodiments, the allocation of individual resource device is performed on a first-come-first-serve basis. In some embodiments, additional processing is performed in order to prevent deadlock during resource contention.

In FIGS. 4A and 4B, nine resource devices R1-R9 and two resource requesting devices 410 and 420 are depicted as examples. Although the resource allocation method 300 is in fact performed by resource controlling devices associated with resource devices R1-R9, the corresponding resource controlling devices are omitted in FIGS. 4A and 4B to avoid obscuring the illustration of the example resource contention scenarios.

In FIG. 4A, a first resource requesting device 410 has a list of requested resource devices R1, R2, R5, and R8. A second resource requesting device 420 has a list of requested resource devices R6, R5, R4, and R7. For the list of requested resource devices from the second resource requesting device 420, the corresponding resource controlling devices for resource devices R6, R5, R4, and R7 handles the resource allocation as described above with regard to the flow chart in FIG. 3. For the list of requested resource devices from the first resource requesting device 410, the corresponding resource controlling devices for resource devices R1 and R2 handles the resource allocation as described above with regard to the flow chart in FIG. 3.

However, when the corresponding resource controlling device for the resource device R2 sends a list of remaining resource devices to a resource controlling device with which the resource device R5 is associated, a resource contention occurs. In some embodiments, the allocation of the resource device R5 is performed on a first-come-first-serve basis. In FIG. 4A, the resource device R5 has been allocated for second resource requesting device 420 prior to receipt of the list from the corresponding resource controlling device for the resource device R2.

In some embodiments, if the resource device R5 is set to the "pending" state for the second resource requesting device 420, the method 300, performed by the resource controlling device of the resource device R5 for the first resource requesting device 410, holds at operation 340. The status of the resource device R5 will subsequently be set to the "allocated" state for the second resource requesting device 420 or set to the "unallocated" state as a result of allocation success/failure of allocating resource devices downstream (from the resource device R5) the list of resource devices from the second resource requesting device 420. In at least one embodiments, the resource controlling device of the resource device R5 keeps the first resource requesting device 410 and other resource requesting devices in a waiting list in a first-come-first-serve basis (i.e., a queue). After the resource device R5 no longer in the "pending" state, the operation 340 for the first resource requesting device 410 resumed and performed as described above with regard to FIG. 3.

In yet some embodiments, if the resource device R5 is already set to the "allocated" state for the second resource requesting device 420, the process 300, performed by the resource controlling device of the resource device R5 for the first resource requesting device 410 determines that the allocation of resource device R5 has failed. In at least one embodiments, an allocation failure message was relays back to the first resource requesting device 410 through the corresponding intermediate resource controlling devices with which the resource devices R2 and R1 associated. The resource devices R2 and R1 upstream (from the resource device R5) the list of resource devices of the first resource requesting device 410 will be set to the "unallocated" state if they were previously set to the "allocated" state or "pending" state.

In yet some other embodiments, the allocation of the resource device R5 also accept prioritized or urgent requests. For example, the list of resource devices from the first resource requesting device 410 carries priority information. If the resource controlling device of the resource device R5 determines that the request from the first resource requesting device 410 takes precedence over the second resource requesting device 420, the resource controlling device of the resource device R5 forces the status of the resource device R5 from the "pending" state to the "unallocated" state.

In FIG. 4B, the first resource requesting device 410 has a list of requested resource devices R1, R2, R5, and R4. The second resource requesting device 420 has a list of requested resource devices R9, R8, R5, and R2. For the list of requested resource devices from the first resource requesting device 410, the corresponding resource controlling devices for resource devices R1 and R2 handles the resource allocation as described above with regard to the flow chart in FIG. 3. For the list of requested resource devices from the second resource requesting device 420, the corresponding resource controlling devices for resource devices R9, R8, and R5 handles the resource allocation as described above with regard to the flow chart in FIG. 3.

However, the corresponding resource controlling devices for resource devices R2 and R5 send lists of remaining resource devices for the first and second resource requesting devices 410 and 420 to each other at about the same time. In other words, a resource contention occurs when a currently received list is from a downstream resource controlling device according to previously received list before allocation completion of the previously received list. The previously received list is the reason of currently setting the corresponding resource device R2 or R5 currently to the "pending" state or "allocated". In some embodiments, the corresponding resource controlling devices for resource devices R2 and R5 handle this type of resource contention as if allocation failure messages are received from each other. In some embodiments, the allocation failure messages are relayed back to the first and second resource requesting devices 410 and 420 through intermediate resource controlling devices. In some embodiments, the first and second resource requesting devices 410 and 420 resend the corresponding lists of requested resource devices to the corresponding first resource controlling devices on the lists upon receipt of the allocation failure messages, immediately or after waiting for a random period of time.

In at least one embodiment, the list of resource devices carries priority information. Therefore, the resource allocation of the list with higher priority will carry on, and the resource allocation of the list with lower priority will be forced to retreat.

Figure 5:
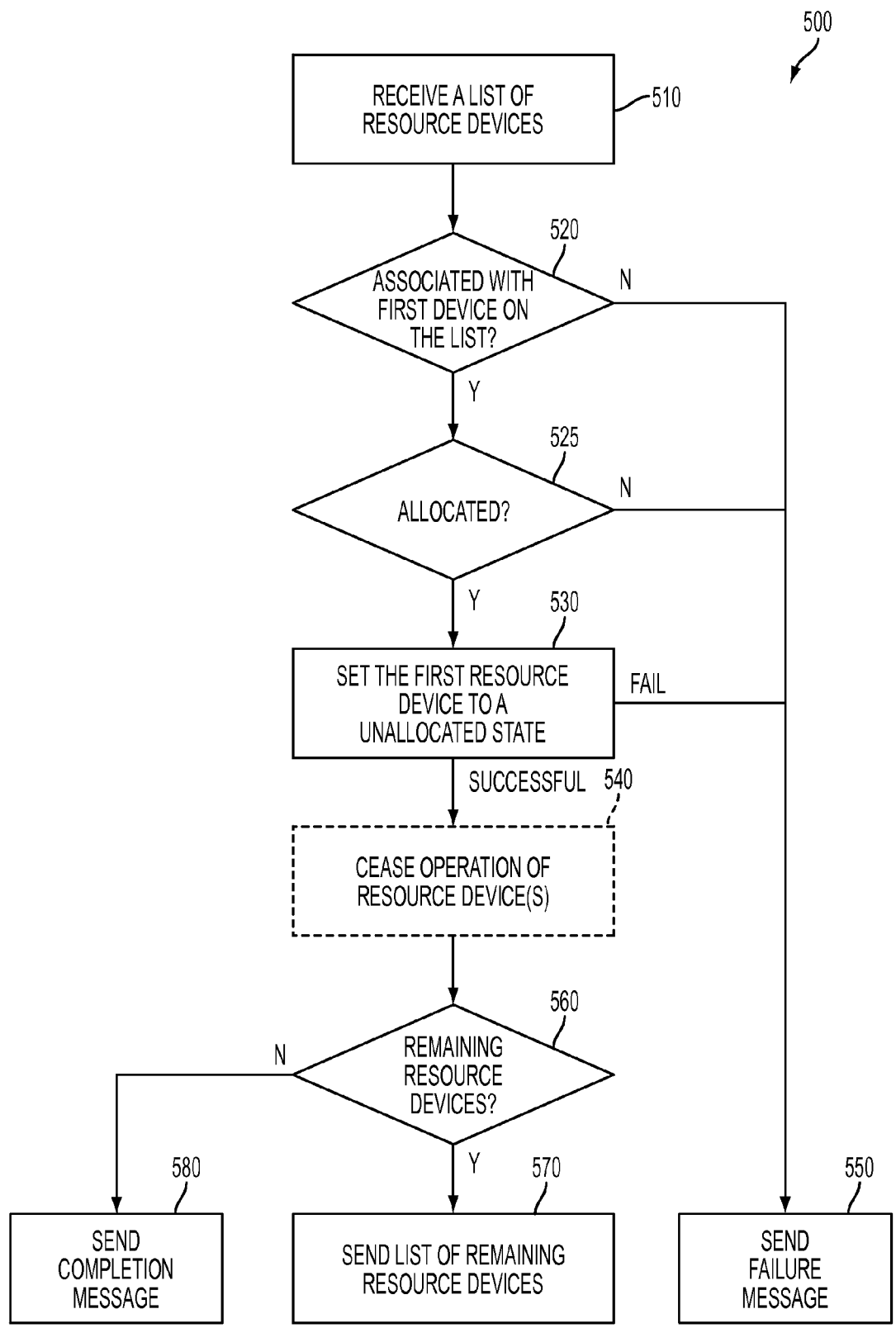
FIG. 5 is a flow chart of a method of resource release for a resource requesting device in accordance with one or more embodiments.

FIG. 5 is a flow chart of a method 500 of resource release for a resource requesting device in accordance with one or more embodiments. It is understood that additional operations may be performed before, during, and/or after the method 500 depicted in FIG. 5, and that some other processes may only be briefly described herein.

As depicted in FIG. 5 and FIGS. 1 and 2A, in operation 510, a resource controlling device 132 receives a list of resource devices (such as the list 210 in FIG. 2A) to be released for the resource requesting device 122 from a sending device (such as the resource requesting device 122 here). In operation 520, the resource controlling device 132 determines if the first resource devices (such as R1) on the list of resource devices 210 is in fact associated with the resource controlling device 132. If the first resource device R1 is associated with the resource controlling device 132, the process moves on to operation 525, where the resource controlling device 132 further confirms if the first resource device R1 is currently allocated for the resource requesting device 122.

In operation 530, after it is determined that the first resource device R1 is currently allocated for the resource requesting device 122, the first resource device R1 is set to "unallocated" state. The process moves on to operation 540, where the resource controlling device 132 optionally cease operation of the corresponding resource device R1 for the resource controlling device 132. In some embodiments, the resource controlling device 132 in operation 540 deactivates the resource device R1. In some embodiments, the resource controlling device 132 in operation 540 sets the resource device R1 to a default operation mode.

In operation 530, if the resource device R1 is not successfully released for the resource requesting device 122, the process moves on to operation 550. The resource controlling device 132 sends a release failure message to the sending device. In addition, for any negative results from operations 520 and 525, the process also moves on to operation 550 to send an allocation failure message to the sending device.

After the resource device R1 is successfully set to the "unallocated" for the resource requesting device 122, the process moves on to operation 550, where the resource controlling device 132 determines if the resource device R1 is the last resource devices on the list 210. If the resource device R1 is not the last resource device on the list 210, the remaining resource devices on the list 210, such as remaining resource devices R2, R3 and R4 still need to be released.

In some embodiments, if the next corresponding resource controlling device happens to be the current resource controlling device 132 (for resource device R2), the process then moves back to operations 530 and 540 to release the resource device R2 associated to the same resource controlling device 132. In some embodiments, instead of immediately performing operations 530 and 540 again for the next resource device R2 of the same resource controlling device 132, the process moves on to operation 570.

In operation 570, the resource controlling device 132 sends a list of remaining resource devices (e.g., resource devices R3 and R4) to a next resource controlling device 134. A first resource device R3 on the list of remaining resource devices is associated with the next resource controlling device 134. On the other hand, if the resource device is the last resource devices on the list 210, the resource controlling device 132 sends a release completion message to the resource requesting device 122, directly or indirectly through intermediate resource controlling devices, in operation 580.

Figure 6:
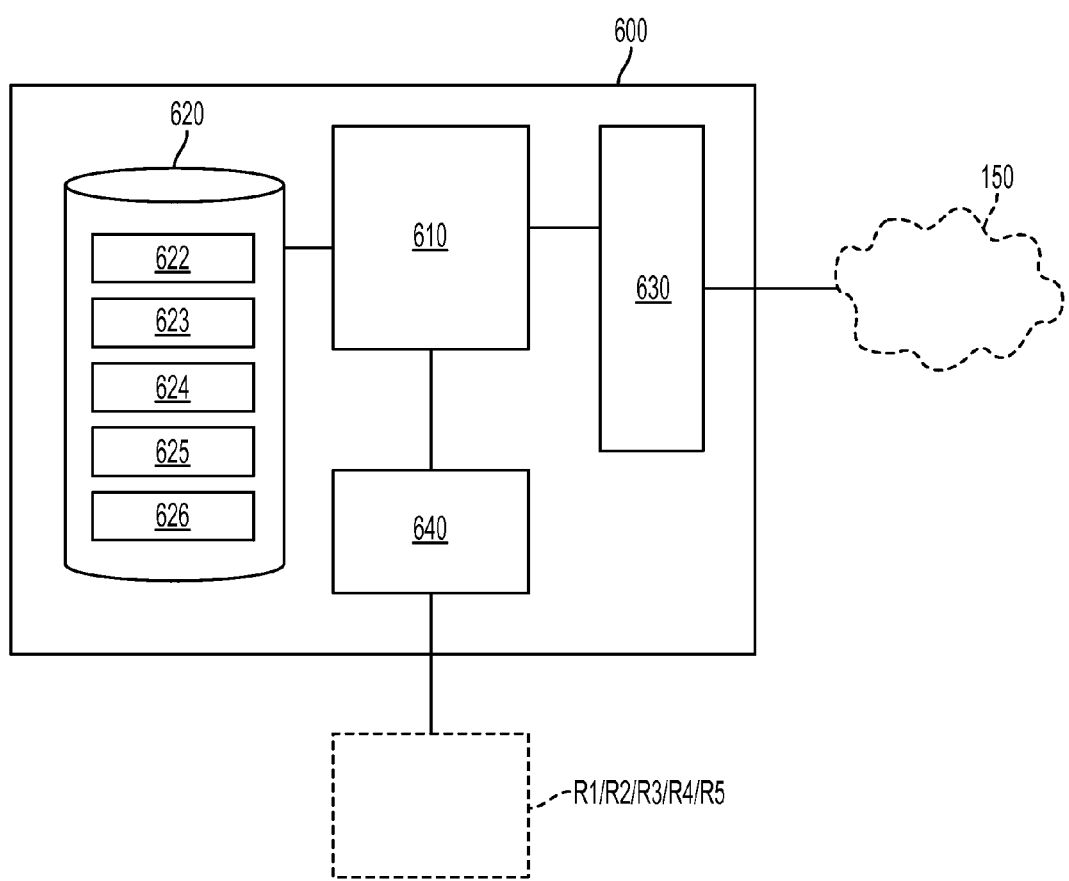
FIG. 6 is a block diagram of a resource controlling device in accordance with one or more embodiments.

FIG. 6 is a block diagram of a resource controlling device 600 in accordance with one or more embodiments. The resource controlling device 600 is usable as the resource controlling devices 132, 134, 136, and 138.

The resource controlling device 600 includes the hardware processor 610 and a non-transitory, computer readable storage medium 620 encoded with, i.e., storing, the computer program code 622, i.e., a set of executable instructions. The processor 610 is electrically coupled to the computer readable storage medium 620. The processor 610 is configured to execute the computer program code 622 encoded in the computer readable storage medium 620 in order to cause the resource controlling device 600 to perform a portion or all of the operations as depicted in FIGS. 3 and 5.

The resource controlling device 600 also includes a network interface 630 and a resource device interface 640 coupled to the processor 610. The network interface 630 allows the resource controlling device 600 to communicate with the network 150 (FIG. 1), to which one or more other resource controlling devices and resource requesting devices are connected. The network interface includes one or more of wireless network interfaces such as BLUETOOTH, WIFI, WIMAX, GPRS, or WCDMA; or wired network interface such as ETHERNET, USB, or IEEE-1394. The resource device interface 640 allows the resource controlling device 600 to communicate with or control the corresponding one or more of the resource devices R1, R2, R3, R4, and R5 (FIG. 1).

In some embodiments, the processor 610 is a central processing unit (CPU), a multi-processor, a distributed processing system, an application specific integrated circuit (ASIC), and/or a suitable processing unit.

In some embodiments, the computer readable storage medium 620 is an electronic, magnetic, optical, electromagnetic, infrared, and/or a semiconductor system (or apparatus or device). For example, the computer readable storage medium 620 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 620 includes a compact disk-read only memory (CD-ROM), a compact disk-read/write (CD-R/W), and/or a digital video disc (DVD).

In some embodiments, the storage medium 620 stores the computer program code 622 configured to cause the computer system 600 to perform the method as depicted in FIG. 3 or FIG. 5. In some embodiments, the storage medium 620 also stores information needed for performing the method 300 and 500 or generated during performing the method 300 and 500, such as a list of authorized resource requesting devices 623 received from the central control equipment 110 (FIG. 1), the received list of resource devices 624, the list of remaining resource devices 625, or information 626 for operation the corresponding one or more of the resource devices R1, R2, R3, R4, and R5.

Figure 7:
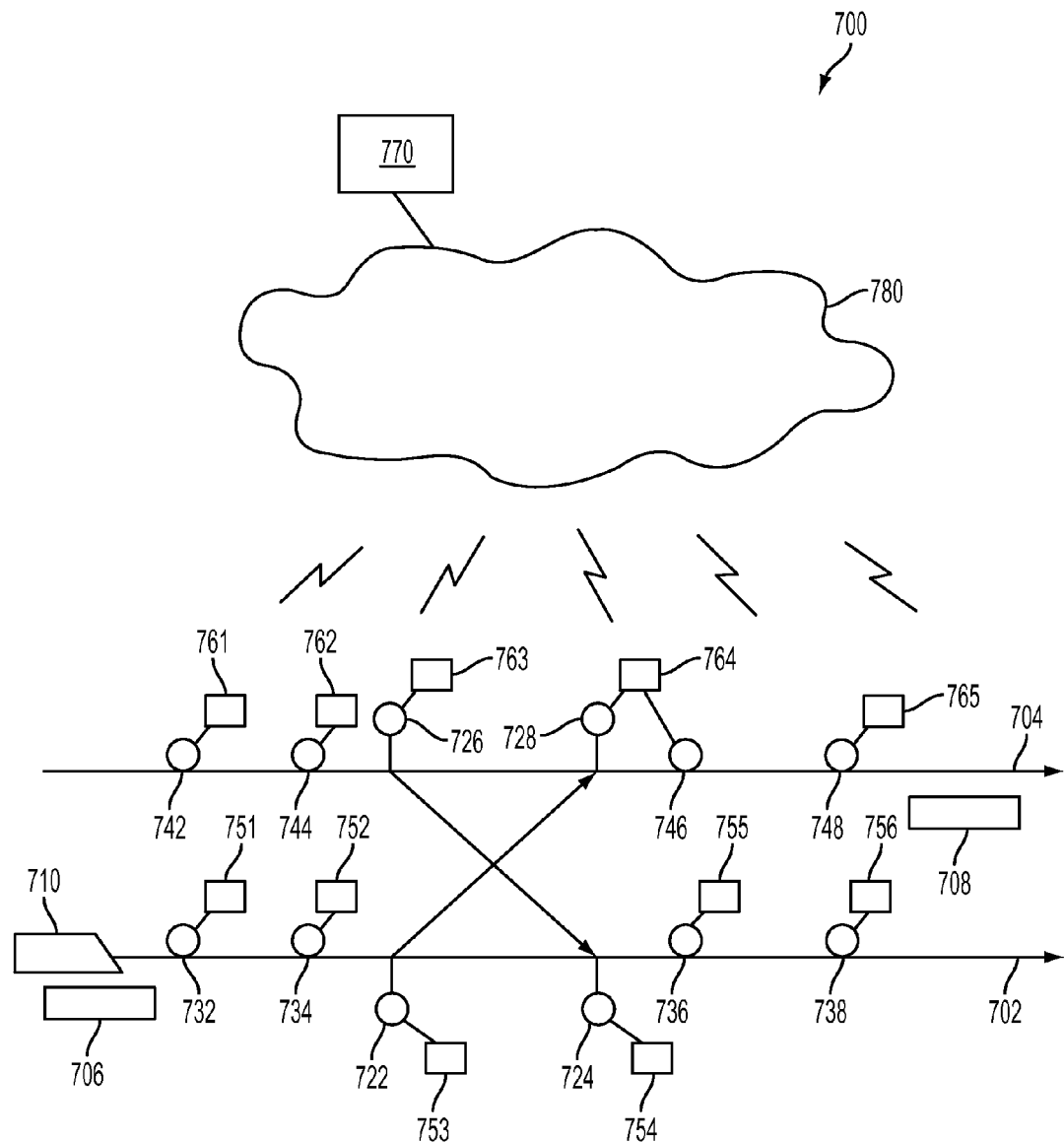
FIG. 7 is a system diagram of an example railway system in accordance with one or more embodiments.

FIG. 7 is an example railway system 700 in accordance with one or more embodiments. One of many possible application of the transportation system 100 (FIG. 1) and methods 300 and 500 (FIGS. 3 and 5) is further illustrated by the example railway system 700.

The railway system 700 includes a first track 702, a second track 704, a first platform 706 accessible to the first track 702, and a second platform 708 accessible to the second track 704. As depicted in FIG. 7, a train 710 is currently on the first track 702 and stops at the first platform 706. Four switches 722, 724, 726, and 728 coupled with the first track 712 and the second track 714 to optionally guide the train 710 to move between the first track 702 and the second track 704. There are multiple signal devices 732, 734, 736, 738, 742, 744, 746, and 748 disposed along the first and second tracks 702 and 704. The switches 722, 724, 726, and 728 and the signal devices 732, 734, 736, 738, 742, 744, 746, and 748 correspond to the resource devices depicted in FIG. 1. Also, the train 710 is equipped with an on-board resource requesting device correspond to the resource requesting device depicted in FIG. 1.

The railway system 700 further includes multiple resource controlling devices 751, 752, 753, 754, 755, 756, 761, 762, 763, 764, and 765, which correspond to the resource controlling devices depicted in FIG. 1. Each of the resource controlling devices 751, 752, 753, 754, 755, 756, 761, 762, 763, 764, and 265 is associated with one or more of the switches 722, 724, 726, and 728 and the signal devices 732, 734, 736, 738, 742, 744, 746, and 748. As depicted in FIG. 7, the resource controlling device 764 is associated with both the switch 728 and the signal device 746. Other resource controlling devices in FIG. 7 are only associated with a corresponding one of switches 722, 724, and 726 and the signal devices 732, 734, 736, 738, 742, 744, and 748.

The railway system 700 also includes a central control equipment 770 corresponds to the central control equipment in FIG. 1 and a network 780 corresponds to the network in FIG. 1. The resource controlling devices 751, 752, 753, 754, 755, 756, 761, 762, 763, 764, and 765, the resource requesting device onboard the train 710, and central control equipment 770 are all coupled to the network 780 in compliance with a wired communication protocol or a wireless communication protocol.

In at least one embodiment, the central control equipment 770 assigned a task to the train 710 to move from the first platform 706 to the second platform 708. In order to perform the task, the train 710 needs to secure the allocation of some of the resource devices, such as the signal devices 732 and 734 along the first track 702, the switch 722 and 728 to direct the train 710 to the second track 704, and the signal devices 746 and 748 along the second track 704. Therefore, the resource requesting device onboard the train 710 sends a list of resource devices including resources 732, 734, 722, 728, 746, and 748 to the first corresponding resource controlling device 751 according to the list. The corresponding resource controlling devices 751, 752, 753, 764, and 765 then perform the resource allocation according to the method 300 depicted in FIG. 3. Once the train 710 arrives the second platform 708, the resource requesting device onboard the train 710 further sends a list of resource devices including resources 732, 734, 722, 728, 746, and 748 to the first corresponding resource controlling device 751 according to the list. The corresponding resource controlling devices 751, 752, 753, 764, and 765 then perform the resource release according to the method 500 depicted in FIG. 5.

In some embodiments, the train 710 dissects the task into two or more sub tasks, and the resource requesting device onboard the train 710 requests for allocation of resource devices in a piecewise manner. For example, the train 710 first requests for the allocation of the signal devices 732 and 734, moves from the first platform 706 to the switch 722, and then requests for the allocation of the switches 722 and 728 and the signal devices 746 and 748. In some embodiments, a complete list of resource devices is sent to the resource controlling devices, with inclusion of the information that successful allocation of the first predetermined number of resource devices is not affected by an unsuccessful result from downstream the list.

The transportation system 100 and the railway system 700 have been used as examples to describe the method 300 and 500 and the resource controlling device 600. However, a person having ordinary skill in the art would appreciate that the method 300 and 500 and the resource controlling device 600 is applicable in many other applications, such as a data communication system or any system that allocation of resource devices is prerequisite for performing an assigned task.

In accordance with one embodiment, a method of resource allocation by a resource controlling device includes receiving, from a sending device, a list of resource devices requested by a resource requesting device. Allocation of a first resource device on the list of resource devices is performed if the first resource device is associated with the resource controlling device and the resource requesting device is authorized. A list of remaining resource devices is sent to a next resource controlling device, if the first resource device on the list of resource devices is successfully allocated for the resource requesting device and the first resource device is not a last resource device on the list of resource devices. A first resource device on the list of remaining resource devices is associated with the next resource controlling device. An allocation failure message is sent to the sending device if the first resource device on the list of resource devices is not successfully allocated for the resource requesting device.

In accordance with another embodiment, a method of resource release by a resource controlling device includes receiving, from a sending device, a list of resource devices to-be-released for a first resource requesting device. Release of a first resource device on the list of resource devices is performed if the first resource device is associated with the resource controlling device and is currently allocated for the resource requesting device. A list of remaining resource devices to-be-released for the resource requesting device is sent to a next resource controlling device, if the first resource device on the list of resource devices is not a last resource device on the list of resource devices. A first resource device on the list of remaining resource devices is associated with the next resource controlling device. A release failure message is sent to the sending device if the first resource device on the list of resource devices is not successfully released for the resource requesting device.

In accordance with another embodiment, a resource controlling device includes a communication interface and a processor. The communication interface is configured to communicate with a resource requesting device and another resource controlling device. The processor is configured to be coupled with one or more resource devices. The processor is configured to: receive a list of resource devices to be allocated or released for the resource requesting device; perform allocation or release of a first resource device on the list of resource devices if the first resource device is coupled with the processing unit; and sending a list of remaining resource devices to the another resource controlling device, a first resource device on the list of remaining resource devices is associated with the another resource controlling device, if the first resource device is not a last resource device on the list of resource devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of resource allocation by a resource controlling device, comprising:
   receiving, by a processor of the resource controlling device from a sending device, a first list of resource devices requested by a first resource requesting device;
   performing allocation of a first resource device on the first list of resource devices, if the first resource device is associated with the resource controlling device and the first resource requesting device is authorized;
   sending a list of remaining resource devices to a next resource controlling device, a first resource device on the list of remaining resource devices is associated with the next resource controlling device, if the first resource device on the first list of resource devices is successfully allocated for the first resource requesting device and the first resource device is not a last resource device on the first list of resource devices; and
   sending an allocation failure message to the sending device, if the first resource device on the first list of resource devices is not successfully allocated for the first resource requesting device.

2. The method of claim 1, further comprising:
   sending an allocation completion message to the first resource requesting device if the first device on the first list of resource devices is successfully allocated for the first resource requesting device and the first resource device is the last resource device on the first list of resource devices.

3. The method of claim 1, further comprising:
   sending an allocation completion message to the sending device, if the first resource device on the first list of resource devices is successfully allocated for the first resource requesting device and either (1) the first resource device is the last resource device on the first list of resource devices or (2) an allocation completion message from the next resource controlling device is received.

4. The method of claim 1, further comprising:
   receiving an allocation failure message from the next resource controlling device; and
   releasing, responsive to the allocation failure message from the next resource controlling device, the allocation of the first resource device on the first list of resource devices.

5. The method of claim 1, further comprising:
   receiving an allocation failure message from the next resource controlling device; and
   sending, responsive to the allocation failure message from the next resource controlling device, an alternative list of remaining resource devices for the first resource requesting device to another next resource controlling device, a first resource device on the alternative list of remaining resource devices is associated with the another next resource controlling device.

6. The method of claim 1, further comprising:
   receiving, from another sending device, a second list of resource devices for a second resource requesting device, a first resource device on the second list of resource devices being the first resource device on the first list of resource devices; and
   performing allocation of the first resource device on the second list of resource devices for the second resource requesting device after receipt of a confirmation regarding whether all resource devices on the list of remaining resource devices are successfully allocated for the first resource requesting device.

7. The method of claim 6, wherein the allocation of the first resource device on the second list of resource devices for either the first resource requesting device or the second resource requesting device is performed on a first-come-first-serve basis.

8. The method of claim 1, further comprising:
   sending the allocation failure message to the sending device if the first resource device on the first list of resource devices is not associated with the resource controlling device.

9. The method of claim 1, further comprising:
   determining that the first resource requesting device is authorized if the first resource requesting device is on a predetermined list of authorized resource requesting devices.

10. A method of resource release by a resource controlling device, comprising:
    receiving, by a processor of the resource controlling device from a sending device, a list of resource devices to-be-released for the first resource requesting device;
    performing release of a first resource device on the list of resource devices if the first resource device is associated with the resource controlling device and is currently allocated for the resource requesting device;
    sending a list of remaining resource devices to-be-released for the resource requesting device to a next resource controlling device, a first resource device on the list of remaining resource devices is associated with the next resource controlling device, if the first resource device on the list of resource devices is not a last resource device on the list of resource devices; and
    sending a release failure message to the sending device if the first resource device on the list of resource devices is not successfully released for the resource requesting device.

11. The method of claim 10, further comprising:
sending a release completion message to the first resource requesting device if the first resource device on the list of resource devices is successfully released for the resource requesting device and the first resource device is the last resource devices on the list of resource devices.

12. The method of claim 10, further comprising:
sending a release completion message to the sending device if the first resource device on the list of resource devices is successfully released for the resource requesting device and either (1) the first resource device are the last resource device on the list of resource devices or (2) a release completion message from the next resource controlling device is received.

13. The method of claim 10, further comprising:
relaying one or more of release failure messages and release completion messages regarding resource devices on the list of remaining resource devices to the sending device.

14. The method of claim 10, further comprising:
sending the release failure message to the sending device if the first resource device on the list of resource devices is not associated with the resource controlling device.

15. A resource controlling device comprising:
a communication interface configured to communicate with a resource requesting device and another resource controlling device; and
a processor configured to be coupled with one or more resource devices, the processor being configured to:
receive a list of resource devices to be allocated or released for the resource requesting device;
perform allocation or release of a first resource device on the list of resource devices if the first resource device is coupled with the processor; and
sending a list of remaining resource devices to the another resource controlling device, a first resource device on the list of remaining resource devices is associated with the another resource controlling device, if the first resource device is not a last resource device on the list of resource devices.

16. The resource controlling device of claim 15, wherein the allocation performed by the processor comprises further causing the processor to:
set the first resource device on the list of resource devices to an allocated state for the resource requesting device if the first resource device is currently set to an unallocated state.

17. The resource controlling device of claim 15, wherein the allocation performed by the processor comprises further causing the processor to:
set the first resource device on the list of resource devices to a pending state if the first resource device is currently set to an unallocated state resource and the list of remaining resource devices is not empty; and
set the first resource device on the list of resource devices to an allocated state for the resource requesting device after receipt of an allocation confirmation for all resource devices on the list of remaining resource devices if the first resource device is currently set to the pending state.

18. The resource controlling device of claim 15, wherein the allocation performed by the processor comprises further causing the processor to:
set the first resource device on the list of resource devices to a pending state if the first resource device is currently set to an unallocated state and the list of remaining resource devices is not empty; and
set the first resource device on the list of resource devices to the unallocated state after receipt of an allocation failure message for all resource devices on the list of remaining resource devices if the first resource device on the list of resource devices is currently set to the pending state.

19. The resource controlling device of claim 15, wherein the processor is further configured to:
send a message indicative of allocation completion or release completion to the resource requesting device if the first resource device is the last resource device on the list of resource devices.

20. The resource controlling device of claim 15, wherein the processor is further configured to:
determine if the resource requesting device is on a predetermined list of authorized resource requesting devices; and
ignore the list of resource devices to be allocated for the resource requesting device if the resource requesting device is not on the predetermined list of authorized resource requesting devices.

* * * * *